(12) United States Patent
Bäumler et al.

(10) Patent No.: US 7,986,437 B2
(45) Date of Patent: Jul. 26, 2011

(54) METHOD, COMPUTER PROGRAM PRODUCT, AND DEVICE FOR THE CREATION AND PROCESSING OF DOCUMENT DATA COMPRISING INDEXED COLOR MANAGEMENT RESOURCES

(75) Inventors: Ulrich Bäumler, Poing (DE); Göran Eiler, Poing (DE); Dieter Jörgens, Baldham (DE); José La Rosa Ducato, Erding (DE); Benno Petschik, Markt Schwaben (DE); Rüdiger Siemens, München (DE)

(73) Assignee: Oce Printing Systems GmbH, Poing (DE)

( * ) Notice: Subject to any disclaimer, the term of this patent is extended or adjusted under 35 U.S.C. 154(b) by 499 days.

(21) Appl. No.: 12/160,822

(22) PCT Filed: Dec. 15, 2006

(86) PCT No.: PCT/EP2006/069768
§ 371 (c)(1),
(2), (4) Date: Jul. 14, 2008

(87) PCT Pub. No.: WO2007/087935
PCT Pub. Date: Aug. 9, 2007

(65) Prior Publication Data
US 2010/0296112 A1    Nov. 25, 2010

(30) Foreign Application Priority Data

Jan. 20, 2006 (DE) .................. 10 2006 002 886

(51) Int. Cl.
*H04N 1/60* (2006.01)
(52) U.S. Cl. ......... 358/1.9; 358/1.15; 358/521; 358/523
(58) Field of Classification Search .............. 358/1.9, 358/1.15, 1.16, 504, 518, 521, 523, 300; 345/589, 593, 600–602; 399/28, 54; 382/162, 382/167
See application file for complete search history.

(56) References Cited

U.S. PATENT DOCUMENTS
5,768,488 A    6/1998  Stone et al.
(Continued)

FOREIGN PATENT DOCUMENTS
DE    10 2006 002 878    7/2007
(Continued)

OTHER PUBLICATIONS

Advanced Function Presentation—Programming Guide and Line Data Reference—Oct. 2000.
Data Stream and Object Architectures—Mixed Object Document Content Architecture Reference Apr. 2001.
IBM Print Services Facility for OS/390 & z/OS Introduction Version 3, Release Mar. 30, 2002.
IBM Data Stream and Object Architectures—Image Object Content Architecture Reference Aug. 2002.
IBM Data Stream and Object Architectures—Intelligent Printer Data Stream Reference—Nov. 2002.
(Continued)

*Primary Examiner* — Scott A Rogers
(74) *Attorney, Agent, or Firm* — Schiff Hardin LLP

(57) ABSTRACT

In a method, program, or device to generate or process a document data stream that comprises data relating to color management resources wherein processing of color-related data of the document data stream can be controlled, associating at least one indexed color management resource with the document data stream wherein with the management resource color-related data of the document data stream can be associated with multiple predetermined color palettes. Within a color palette, an index value is respectively associated with multiple color. Respective values regarding the index colors are stored in the color management resource. The values are associated with corresponding proportions of color tones to reproduce the respective indexed color. The color palettes are compared between the system that generates the document data and an output system that outputs the document data, the document data stream is structured.

21 Claims, 15 Drawing Sheets

U.S. PATENT DOCUMENTS

| | | | |
|---|---|---|---|
| 5,982,997 | A | 11/1999 | Stone et al. |
| 6,097,498 | A | 8/2000 | Debry et al. |
| 6,327,624 | B1 | 12/2001 | Mathewson, II et al. |
| 6,430,311 | B1 | 8/2002 | Kumada |
| 6,603,571 | B1 * | 8/2003 | Nomoto ............... 358/1.15 |
| RE39,161 | E * | 7/2006 | Edge et al. ............ 345/601 |
| 7,266,238 | B2 * | 9/2007 | Haikin ............... 382/162 |
| 7,280,251 | B1 * | 10/2007 | Holub ............... 358/1.9 |
| 7,365,877 | B2 | 4/2008 | Meier et al. |
| 7,382,379 | B1 * | 6/2008 | Edge et al. ............ 345/600 |
| 7,710,560 | B2 * | 5/2010 | Holub ............... 356/300 |
| 2005/0024668 | A1 | 2/2005 | Schmidt |
| 2005/0248787 | A1 | 11/2005 | Aschenbrenner et al. |
| 2006/0050288 | A1 | 3/2006 | Aschenbrenner et al. |
| 2010/0157329 | A1 * | 6/2010 | La Rosa Ducato ........ 358/1.9 |

FOREIGN PATENT DOCUMENTS

| | | |
|---|---|---|
| EP | 0 660 589 | 6/1995 |
| EP | 0 843 237 | 5/1998 |
| EP | 1 155 819 | 11/2001 |
| EP | 1 379 076 | 1/2004 |
| EP | 1 370 071 | 9/2005 |
| GB | 2 368 436 | 5/2002 |
| JP | 2002 44478 A | 2/2002 |
| JP | 2004 112181 A | 4/2004 |
| JP | 2007 536656 | 12/2007 |
| WO | WO 03/069548 | 8/2003 |
| WO | WO 2004/008379 | 1/2004 |
| WO | 2005/109324 A1 | 11/2005 |

OTHER PUBLICATIONS

Data Stream and Object Architectures—Mixed Object Document Content Architecture Reference—Jan. 2004.

Data Stream and Object Architectures—Mixed Object Document Content Architecture Reference—Jan. 2004 IBM.

The World of Printers Technologies of Océ Printing Systems Nov. 7 2002.

AFP Color Consortium Color Management Object Content Architecture (CMOCA) Reference—May 2006.

* cited by examiner

XOH-OPC: Color Support SDF — 17a

| Byte | Name | Range (hex) | Meaning |
|---|---|---|---|
| 0 – 1 | SDF length | 0004 – xxxx | Length of this SDF, including itself |
| 2 – 3 | CS SDF ID | 00## | DeviceN Color identification SDF |
| Zero or more property fields | | | |

General Properties — 18

| | | | |
|---|---|---|---|
| + 0 | Length | | |
| +1 | Support type | 00 | General properties |
| + 2 –3 | | | |
| + 4 – end | | | Properties |
| | | | Print head resolution X&Y direction |
| | | | Number of bits per pixel |
| | | | Color management Y/N |

Black — 19

| | | | |
|---|---|---|---|
| + 0 | Length | | |
| +1 | Support type | 01 | Black |
| +2 – 3 | Front/back | | |
| + 4 – end | | | Properties |

Highlight Color — 20

| | | | |
|---|---|---|---|
| + 0 | Length | | |
| +1 | Support type | 02 | Highlight Color |
| +2 – 3 | Front/back | | |
| + 4 – end | | | Properties |
| | | | <<Color Definition System>> certified toners /ink available |

Properties of the individual highlight colors are defined through one or more Colorant Identification SDFs.

Full Process Color — 21

| | | | |
|---|---|---|---|
| + 0 | Length | | |
| +1 | Support type | 03 | Full Process Color |
| +2 – 3 | Front/back | | |
| + 4 – end | | | Properties: |
| | | | Number of colors: nn |

Fig. 4

XOH-OPC: Colorant Identification SDF  — 18

| Byte | Name | Value (hex) | Meaning |
|---|---|---|---|
| 0 – 1 | SDF length | 0020 – xxxx | Length of this SDF, including itself |
| 2 – 3 | DNC SDF ID | 00## | Colorant identification SDF |
| 4 – 5 | HLC Number | 0000 – nnnn | Color number (equals number in the HLC space) Note: 0000 is usually black. |
| 6 – 7 | C Properties | | Properties of the colorant (toner / ink) |
| | Bit 0 – 10 | All B"0" | Reserved, must be zero |
| | Bit 11 | | Coating colorant |
| | | B"0" | Normal toner / ink |
| | | B"1" | Coating toner / ink |
| | Bit 12 | | Invisible colorant |
| | | B"0" | Visible toner / ink |
| | | B"1" | Invisible toner / ink |
| | Bit 13 | | Magnetic colorant |
| | | B"0" | Non-magnetic toner / ink |
| | | B"1" | Magnetic toner / ink |
| | Bit 14 | | Fluorescent colorant |
| | | B"0" | Non-fluorescent toner / ink |
| | | B"1" | Fluorescent toner / ink |
| | Bit 15 | | Transparent colorant |
| | | B"0" | Opaque toner / ink |
| | | B"1" | Transparent toner / ink |
| 8 – 9 | Availability | | Availability of the colorant |
| | Bit 0 – 7 | All B"0" | Not used, must be zero |
| | Bit 8 | | Colorant area descriptor flag (front side) |
| | | B"0" | The print head reaches over the full printable width, any optional colorant area descriptor fields may be ignored |
| | | B"1" | The print head only reaches over a part of the full printable area, the area which can be printed must be described through one or more colorant area descriptor fields |
| | Bit 9 | | Colorant area descriptor flag (back side) |
| | | B"0" | The print head reaches over the full printable width, any optional colorant area descriptor fields may be ignored |
| | | B"1" | The print head only reaches over a part of the full printable width, the area which can be printed must be described through one or more colorant area descriptor fields |
| Table continues on the next page | | | |

Fig. 5a

| Byte | Name | Value (hex) | Meaning |
|---|---|---|---|
| 7 – 8 (cont.) | Bit 10 – 11 | All B"0" | Not used, must be zero |
| | Bit 12 – 13 | | Colorant available |
| | | B"00" | Not available |
| | | B"01" | Front side |
| | | B"10" | Back side |
| | | B"11" | Both sides |
| | Bit 14 – 15 | | Colorant installed |
| | | B"00" | Not installed |
| | | B"01" | Front side |
| | | B"10" | Back side |
| | | B"11" | Both sides |
| 9 – 15 | Reserved | | Reserved, must be zero |
| Zero or more optional Colorant Area Descriptor entries: | | | |
| Zero or more optional Colorant Identification entries: | | | |

Fig. 5b

Colorant Area Descriptor entry

| Offset | Name | Value (hex) | Meaning |
|---|---|---|---|
| + 0 | Entry length | 0E, 10 | Entry length, including this field |
| + 1 | Entry type | 00 | Colorant Area Descriptor |
| + 2 | Flags Bit 0 – 5 | All B"0" | |
| | Bit 6 – 7 | 00 | Not allowed |
| | | 01 | Front side |
| | | 10 | Back side |
| | | 11 | Both sides |
| +3 | Reserved | 00 | Reserved |
| +4 | U-Base | | Unit Base for this SDF |
| | | 00 | Ten inches |
| + 5 | Reserved | 00 | Reserved |
| + 6 – 7 | UPUB | 0960 | 2400 L-Units/10" |
| | | 3840 | 14,400 L-Units/10" |
| + 8 – 9 | Left Edge | | Position of the left edge of the print head |
| | | 0000 – 7FFF | The position of the left edge of the head |
| + 10 – 11 | Extent | | Width of the print head |
| | | 0000 – 7FFF | The width of the print head |
| 12 – 13 | Top Edge | | Optional values for the perpendicular direction. |
| 14 – 15 | Extent | | |

Fig. 6

Colorant Identification entry 20

| Offset | Name | Value (hex) | Meaning |
|---|---|---|---|
| Free format name: 8-bit Unicode string | | | |
| + 0 | Entry length | 03 – FF | Entry length, including this field |
| + 1 | Entry type | 11 | Entry type = free format colorant name |
| + 2 – nn | C Name | String | Colorant name: free format 8-bit Unicode string |
| Free format name: 16-bit Unicode string | | | |
| + 0 | Entry length | 03 – FE | Entry length, including this field |
| + 1 | Entry type | 12 | Entry type = free format colorant name |
| + 2 – nn | C Name | string | Colorant name: free format 16-bit Unicode string |
| <<Color Definition System>>: 8-bit Unicode string | | | |
| + 0 | Entry length | 03 – FF | |
| + 1 | Entry type | 21 | Entry type = colorant name/code |
| + 2 – nn | C Name | string | Colorant name: 8-bit Unicode string |

Byte 4 – 5: HLC number. This two-byte unsigned binary number equals the HLC number (Component 1) which is specified with the (X"06") Highlight Color Space. The value X"0000" is reserved for Black. Numbers from X"0001" to X"FFFF" may be used for Highlight Color toners or inks.

HLC numbers are assigned when the color stations / heads are installed in the printer. Two physical stations with the same HLC number, i.e. for front and back, must also contain the same colorant. The HLC number must be unique. Two Colorant Identification SDFs can therefore not contain the same HLC number.

If the HLC color space is used, in for example a X"4E" Triplet, then the HLC number of the triplet will select the colorant which is described through the same HLC number in byte 4 – 5 of the Colorant Identification SDF.

Byte 7: Availability
Bit 8: Colorant Area Descriptor flag (front side).
- B"0"   The colorant is available over the full "actual medium presentation space width". Any optional Colorant Area Descriptor entries can be ignored.
- B"1"   The colorant can only be printed on a part of the "actual medium presentation space width".

Bit 9: Colorant Area Descriptor flag (back)
- B"0"   The colorant is available over the full "actual medium presentation space width". Any optional Colorant Area Descriptor entries can be ignored
- B"1"   The colorant can only be printed on a part of the "actual medium presentation space width".

Bit 4 – 5: Colorant Available
- B"00"   Colorant is not available. The HL color may be installed, but not available at the moment.
- B"01"   Front side. The colorant is available for the front side only.
- B"10"   Back side. The colorant is available for the back side only.
- B"11"   Both sides. The colorant is available for both sides.

Available means that the colorant is immediately available for printing without any operator intervention. Available colorants must, of course, also be reported as installed.

Fig. 7a

Bit 6 – 7: Colorant Installed
- B"00" Colorant is not installed. The SDF is invalid. This flag value should therefore not appear.
- B"01" Front side. The colorant is installed for the front side only.
- B"10" Back side. The colorant is installed for the back side only.
- B"11" Both sides. The colorant is installed for both sides.

Installed means that the colorant has been installed in the printer, and may, or may not, be available for printing without operator intervention. The operator may have to enable or switch on a print head which is already installed.

Byte 16 – end: The Colorant Identification head may be followed by one or more entries. Two types of entry are possible:

- Colorant Area Descriptor entries. The entry is only used when the colorant can not be used over the full Media Presentation Space.

- Colorant Identification entries. Entries of this type may be used to define one or more colorant names, under which the colorant can later be selected. More than one name may be defined for the same colorant, all names will then give the same result. Colorant names must be unique to one SDF and one HLC number. Example: A colorant name, such as "Caribbean blue", must be connected with one specific HLC number and may also not appear in more than one Colorant Identification SDF.

Three types of colorant names may be used:

Entry Type X"11" : The colorant name is given as a free format 8-bit Unicode string.

Entry Type X"12" : The colorant name is given as a free format 16-bit Unicode string.

Entry Type X"21" – <<Color Definition System>> name. The colorant name is in the form of a <<Color Definition System>> name. The name is coded as an 8-bit Unicode string. Note that a highlight color printer may only report a <<Color Definition System>> name in this field when the toner or ink in the printer has been certified and licensed by <<Color Definition System>>. A full process color printer must have a <<Color Definition System>> licensed LUT.

Fig. 7b

Color Palette field

| Offset | Name | Range | Meaning | Exception |
|---|---|---|---|---|
| + 0 - 1 | Length | nnnn | Length of field, including the parameter itself | EC 1 |
| + 2 | Field ID | 03 | Color Palette field | EC 2 EC 3 |
| + 3 | Palette number | 00 - FE | Number of the palette in the set. | EC 10 EC 11 |
| + 4 - 5 | | 0000 | Reserved | |
| + 6 | Type | | Color Space: | EC 12 EC 13 |
| | | 3C | Indexed CMR | |
| | | 04 | CMYK | |
| | | 08 | Color Conversion | |
| | | 01 | Link Color Conversion | |
| | | 06 | Calibration Curve | |
| | | 40 | OCA | |
| + 7 | CNO | 01 - nn | Number of color components | EC 14 |
| + 8 | | 00, 01 | Number of secondary components | EC 15 |
| + 9 | | 01 - mm | Number of bytes / entry | EC 16 |
| + 10 - 15 | | | Reserved, should be zero | |
| + 16 - 17 | | 0006 - nnnn | CIL Offset #1 (Colorant space only) | EC 17 |
| + 18 - 19 | | | CIL Offset #2 | EC 17 |
| + 20 - 21 | | | CIL Offset #3 | EC 17 |
| + 22 - kk | | | Further Offset values | |
| Offset entries equal to the number of color components, the rest up to byte 63 is reserved | | | | |
| + kk+1 - 63 | | | Reserved, should be zero | |
| + 64 | Index list (256 entries) | | | |

Fig. 8a

Byte + 0 – 1: Length of the field, including the length parameter itself. The length must equal 64 bytes for the head plus the length of the index list. The length of the index list is 256 x the value of the parameter "Number of bytes / entry" (byte 9).

Byte + 3: Palette number. The number of the palette within the set. If more than one palette is used, then the numbers of the individual palette fields must come in an ascending order.

Byte + 6: Color Space: If the colorant space is used, then the color palette field must have been preceded by a Colorant Identification List.

Note that the specification of the CMR Indexed Color Space is not allowed.. This is natural, since a CMR Indexed color value, in for example an X'4E' Triplet, points to an entry in the index list. Recursive CMR Index Color spaces are not possible.

Byte + 7: Number of color components. For color space:
- Colorant: The number of color components must be at least one.
- CMYK: 4 components
- LAB 3 components
- RGB 3 components
- HLC 1, 2 or 3 components
- OCA 1 component

Byte + 8: Number of secondary components.
- X'00' – no additional components are used
- X'01' – One secondary component, i.e. transparency value

Byte + 9: Number of bytes / entry. For color space:
- Indexed CMR: 1 byte per component.
- CMYK: 4 bytes
- Color Conversion: 3 bytes
- Link Color Conversion: 3 bytes
- Calibration Curve: 2 bytes One byte is added to the values above when a secondary component is used.

Byte + 16 – 17 : Offset to an entry in the Colorant Identification List. The offset is given in bytes from byte 0 of the CI List field to the first byte of the Colorant Identification Entry. Example: the offset of the 1st entry in the CI List would be X'0006'. The offset value is only provided when the Colorant color space is used. The bytes are reserved with other color spaces.

Byte + 18 – nn : Further offset values. The number of offset values must equal the number of components in the Colorant color space as defined through byte 7. The remaining area up to byte 63 is reserved and should be zero.

Byte + 64 – end: A palette lists of 256 CMR Indexed Color entries. The format of an entry is defined through the parameters in byte 6 – 8.

Fig. 8b

Example1: Colorant Space with three colorants and a transparency value:

| CMR Indexed Color list (256 entries) | | | | |
|---|---|---|---|---|
| + 0 | Int1 | 00 – FF | Intensity colorant #1 | |
| + 1 | Int2 | 00 – FF | Intensity colorant #2 | |
| + 2 | Int3 | 00 – FF | Intensity colorant #3 | |
| + 3 | Transparency | 00 – FF | Transparency value | |

Fig. 9

Example 2: CMYK Color Space without transparency value

| CMR Indexed Color list (256 entries) | | | | |
|---|---|---|---|---|
| + 0 | IntC | 00 – FF | Intensity C | |
| + 1 | IntM | 00 – FF | Intensity M | |
| + 2 | IntY | 00 – FF | Intensity Y | |
| + 3 | IntK | 00 – FF | Intensity K | |

Fig. 10

Color Substitution Palette field (optional) 22

| Offset | Name | Range | Meaning | Exception |
|---|---|---|---|---|
| + 0 – 1 | Length | nnnn | Length of field, including the parameter itself | EC 1 |
| + 2 | Field ID | 04 | Color Substitution Palette field | EC 2<br>EC 3 |
| + 3 | Palette number | 00 – FE | Number of the substitution palette in the set. | EC 10<br>EC 11 |
| + 4 – 5 | | 0000 | Reserved | |
| + 6 | | | Color Space: | EC 12 |
| | | 3C | Colorant | EC 13 |
| | | 04 | CMYK | |
| | | 08 | LAB | |
| | | 01 | RGB | |
| | | 06 | HLC | |
| | | 40 | OCA | |
| + 7 | | 01 – nn | Number of color components | EC 14 |
| + 8 | | 00, 01 | Number of secondary components ($\alpha$ channel) | EC 15 |
| + 9 | | 01 – mm | Number of bytes / entry | EC 16 |
| + 10 – 15 | | | Reserved, should be zero | |
| + 16 – 17 | | | CIL Offset #1 (Colorant space only) | EC 17 |
| + 18 – 19 | | | CIL Offset #2 | EC 17 |
| + 20 – 21 | | | CIL Offset #3 | EC 17 |
| Offset entries equal to the number of color components, the rest up to byte 63 is reserved ||||||
| + kk – 63 | | | Reserved, should be zero | |
| + 64 | Index list (256 entries) | | | |

Fig. 11

X'4E' Triplet with Color Space X"30" –
CMR Indexed Color Space                                          ╭─ 23

| Byte | Name | Range (hex) | Meaning | Exception |
|---|---|---|---|---|
| 0 | Length | 0E | Triplet length, including itself | 020E..01 |
| 1 | ID | 4E | Color specification triplet | |
| 2 | Reserved | 00 | Reserved, must be zero | |
| 3 | Color space | 30 | Color space CMR Indexed color space | 020E..02 |
| 4 – 7 | Reserved | 0000 0000 | Must be zero | |
| 8 | ColSize1 | 10 | Number of bits in component 1 – 16 bits | |
| 9 | ColSize2 | 00 | Number of bits in component 2 | |
| 10 | ColSize3 | 00 | Number of bits in component 3 | |
| 11 | ColSize4 | 00 | Number of bits in component 4 | |
| 12 | Color value 1 | 00 – FF | CMR Indexed Color: Palette number | |
| 13 | Color value 2 | 00 – FF | CMR Indexed Color: Index number | |

Byte 12 – 13 : Color Values 1 and 2: These bytes provide the index value of the CMR Indexed Color to be used to print the object. Byte 12 contains the number of a Color Palette field within the Indexed CMR. Byte 13 contains the entry number in the CMR Indexed Color list of the palette. The entry defines which colorants shall be combined and with what intensities in order to create the desired highlight color results.

Fig. 12

Tile Set Color

| Byte | Name | Range (hex) | Meaning | Exception |
|---|---|---|---|---|
| 0 | ID | B7 | Tile Set Color ID | |
| 1 | Length | nn | Length of the parameters to follow | |
| 2 | Cspace | 04<br>08<br>06<br>30 | Color space<br>CMYK<br>CIELab<br>Highlight Color Space, the normal HLC color<br>CMR Indexed Color space | |
| 3 – 5 | Reserved | 000000 | Reserved, should be zero | |
| Values below shown for the new X"30" color space: | | | | |
| 6 | Size 1 | 10 | Number of Bits/IDE for component 1 | |
| 7 | Size 2 | 00 | Number of Bits/IDE for component 2 | |
| 8 | Size 3 | 00 | Number of Bits/IDE for component 3 | |
| 9 | Size 4 | 00 | Number of Bits/IDE for component 4 | |
| 10 | Color value 1 | 00 – FF | CMR Indexed Color: Palette number | |
| 11 | Color value 2 | 00 – FF | CMR Indexed Color: Index number | |

Byte 2: Color Space. X"30" – the new value Index Color Space.

Byte 10 – 11 : Color Values 1 and 2: These bytes provide the index value of the CMR Indexed Color to be used to print the object. Byte 10 contains the number of a Color Palette field within the Indexed CMR. Byte 11 contains the entry number in the CMR Indexed Color list of the palette. The entry defines which colorants shall be combined and with what intensities in order to create the desired highlight color results.

The image may be made up of several tiles. Each tile carries its own "Tile Set Color" SDF and two tiles may therefore use different highlight colors.

Two tiles may overlap. The Transparency Mask is used in the same way as with today's FS 45 images to determine if a tile shall be transparent or opaque to the underlying tiles.

Fig. 13

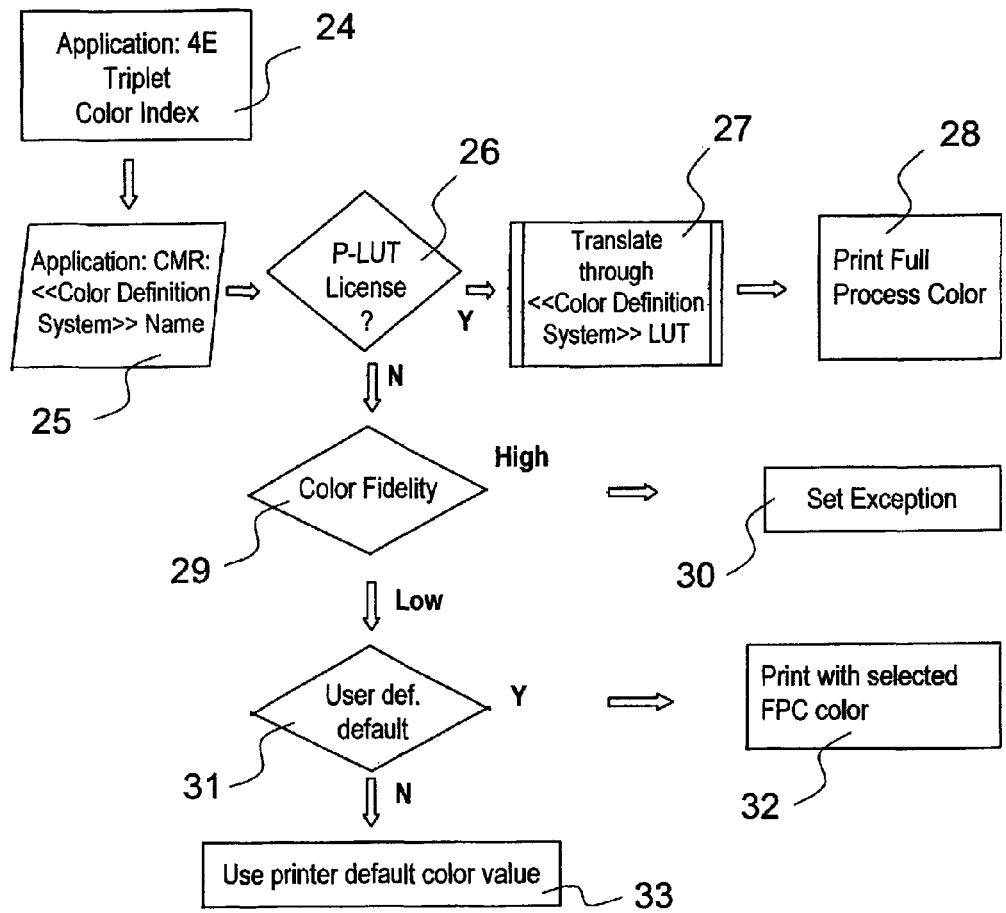

If a <<Color Definition System>> name has been selected and the Color Fidelity has been set to high, then a <<Color Definition System>> licensed look-up table must be available, otherwise an exception will be set. The look-up table translates the <<Color Definition System>> name into a full process color. If the fidelity has been set to low, and no <<Color Definition System>> LUT is present, the printer may either use a user defined default color, or the printer default color.

Fig. 14

METHOD, COMPUTER PROGRAM PRODUCT, AND DEVICE FOR THE CREATION AND PROCESSING OF DOCUMENT DATA COMPRISING INDEXED COLOR MANAGEMENT RESOURCES

BACKGROUND

The preferred embodiment concerns a method, a device system and a computer program for processing a resource-based document data stream. A typical document data format of this type is the AFP™ format (Advanced Function Presentation). It is used in particular in digital print production environments, i.e. in data processing and printing systems that process document data with high speed of up to a few thousand pages per minute, wherein the documents in particular respectively comprise document-specific data.

The preferred embodiment in particular concerns the generation and processing of resource-based document data streams that contain color-related data for the documents.

Details of the document data stream AFP™ are described in the publication Nr. S544-3884-02, published by International Business Machines Corp. (IBM) with the title "AFP Programming Guide and Line Data Reference". Pages v through viii show an overview. An introduction is on Pages 1 through 3. Details and examples of structured fields are described on pages 65 through 70. The AFP document data stream was developed further into the MO:DCA™ document data stream which is described in, for example, the IBM publication SC31-6802-06 (January 2004) with the title "Mixed Object Document Content Architecture Reference (see therein particular the overview on pages 248 through 254 and 260 through 262 as well as pages 543 through 549)". Details of this data stream are also described in U.S. Pat. No. 5,768,488. Specific field definitions of the data stream that contain control data (what are known as "structural fields") are also explained there.

In the course of print production jobs, AFP/MO:DCA data streams are frequently converted into Intelligent Printer Data Stream™ (IPDS™) data streams. Such a process is shown in U.S. Pat. No. 5,982,997. Details regarding IPDS data streams are described in the IBM document Nr. S544-3417-06, "Intelligent Printer Data Stream Reference", 7th Edition (November 2002), for example (see there in particular the overview from page 1 through xxii, the introduction on pages 56 through 88 and the explanations for Load Copy Control on pages 140 through 150).

What are known as Map Media Type (MMT) structured fields are also provided in data streams of the AFP/IPDS architecture (see the aforementioned publication Nr, SC31-6802-06 on pages 260-262). With them it is possible to specify the print media to be used in print applications, respectively identified by name or type designation. A control software to control a printing device then checks which feed tray in a printing device contains the desired recording medium and selects the first corresponding tray for printing.

A physical feed tray of a printing device is selected by a print application with this method, but the type of the medium to be printed (such as, for example, specific preprinted forms, transparent films, color paper etc.) that should be used for the application is not specified. Such established applications can only be used for a specific, indicated printing system and are dependent on setup settings of the printing device. The problem also thereby exists that such established applications do not produce the expected results when they are sent to a different printing system.

Various additional print data streams and printing systems that are suitable for processing of the most varied print data streams (including AFP and IPDS) are described in the publication "Das Druckerbuch", Dr. Gerd Goldmann (Editor), Océ Printing Systems GmbH, 6th Edition (May 2004), ISBN 3-00-001019-x. The server system Océ PRISMAproduction is described in Chapter 14. This flexible print data server system is suitable, for example, to: receive print data—the print data being in a specific print data language such as AFP (Advanced Function Presentation), MO:DCA, PCL (Printer Command Language), PostScript, SPDS (Siemens Print Data Stream), in the Portable Document Format (PDF) developed by Adobe Systems Inc. or in the Line Coded Document Data Stream (LCDS) developed by the Xerox Corporation—from data sources such as a source computer; to convert said print data into a specific output format (for example into the Intelligent Printer Data format (IPDS)); and to transfer the data to a print production system in this uniform output format. Various technologies for color printing are described in Chapter 10, in particular the Océ Direct Imaging Technology in Chapter 11 which enables a color printing based on 7 primary colors.

In the specification and further development of print data streams, the problem sometimes exists that new commands must be inserted into the data stream in order to take into account the further technical developments of computers, printing devices and/or post-processing devices. The determination of such extensions is for the most part a relatively complicated process in which various industry partners must cooperate in order to coordinate the changes or, respectively, improvements among one another.

How three new data stream commands (namely WOCC, WOC and END) are added to the Intelligent Printer Data Stream™ (IPDS™) is described in U.S. Pat. No. 6,097,498.

A further possibility to store additional control data in an AFP data stream is to store data in what are known as object containers (see pages 93-95 in the publication Nr. SC31-6802-05, for example).

Additional measures to insert new control information into AFP or IPDS data streams are described in WO 03/069548 (originating from the applicant).

A method to generate a document data stream that contains structured fields is known from U.S. Pat. No. 6,327,624 B1.

How document objects such as text, images, graphics, bar-codes and fonts are handled in the AFP and IPDS data streams is described in the IBM publication SC31-6805-06 with the title "Image Object Architecture Reference", 6th Edition (August 2002) (see there in particular the overview page vi through xvi as well as the introduction on pages 1 through 21). What is known as an Object Content Architecture (OCA) is defined for this in which specific data structures and control or object-identifying parameters are established for the respective objects, for example what is known as the Image Object Content Architecture (IOCA) for images, a corresponding GOCA for graphics, PTOCA for presentation texts etc. The IOCA is described in detail in the aforementioned document. Additional IGM documents that are helpful in understanding the data streams are cited on pages v through vii of the document.

IPDS and AFP data streams normally contain and/or reference what are known as resources that contain data that are required to output the documents. The data of a resource can thereby be used repeatedly via simple referencing for one or more print jobs that in turn contain multiple documents or document parts, without having to be transferred repeatedly. The quantity of data to be transferred from one processing unit (for example a host computer generating the documents)

to a subsequent processing unit (for example a print server or a printing device) is thereby reduced, in particular when data of a plurality of documents are to be transferred that possess or require the same data in part. Examples of such resources are character sets (fonts) or forms to be superimposed on documents (overlays). The resources can thereby be contained in the print data stream itself or be transferred separately from this between the involved systems and respectively only be referenced within various documents. It can thereby in particular be provided that the resources are already stored in the device (for example print server or printing device) conducting additional processing, such that they do not need to be retransferred with each print job but rather must merely be referenced.

Resources that originate at various points or from various sources in the AFP data stream are merged with the corresponding variable data given the presentation of AFP document data. The resource data can thereby be integrated into the document data stream as internal resources or be called from libraries as external resources via a resource name. Furthermore, the data are checked for consistency in a parsing process.

Details such as how what is known as a Line Data or MO:DCA document data stream is converted into an IPDS data stream are described in the document "Print Services Facility for OS/390 & z/OS, Introduction", Vers. 3, Release 3.0, Nr. G544-5625-03 by IBM from March 2002 (see therein particular the overview on pages I through vii, the introduction on pages 1 through 10). The software program Print Service Facility (PSF) thereby combines variable document data with resource data in order to administer and control output data that are sent to a printer as an output device. Software products under the trade names Océ SPS and Océ CIS that possess corresponding functions are developed and marketed by the applicant.

A method for secure administration and association of resources in the processing of resource-based print jobs is known from US 2005/0024668 A1. A method for processing of resource data in a document data stream is known from WO A1-2004/0008379.

In principle the problem that the colors reproduced in an output device do not coincide with the original colors without further techniques occurs in the processing of color-related object data such as images, graphics and texts, for example. To process color data, what is known as color management technology was therefore developed that has as its goal the enabling of a reproduction of colors that is optimally true to the original. For example, color profiles of input and output devices that specify their properties in the processing of color data are defined for this. By taking the color profiles into account, color data can be converted in a processing chain so that the color object reproduced at the end of the chain coincides relatively precisely with the original object. Color data processing on the basis of color profiles is, however, relatively complicated in many cases.

What are known as highlight color (HLC) colors, methods and devices have also been developed for color information, in particular in the field of document data processing. Such colors comprise at least one color tone that normally lies apart from the color space of typical colorants. This color tone can, for example, be an application-specific color tone (for example for a color company logo, a decorative color or what is known as a "spot color") and/or be adapted such that it allows access to color tones that cannot be achieved with standard print colors such as, for example, yellow (Y), magenta (M), cyan (C) and black (K). The assignee Océ markets such highlight color toners for electrographic printers, for example, under the trade name Océ Custom Tone®. It is thereby in particular possible to provide printing materials (toner) specific to the customer in special colors that are unique in their specification and are used only by this customer because they exhibit a color individually determined by the customer, for example, which color identifies the customer. Such color printing materials are used for printing of company logos in a specific "company color", for example.

A standard color and an HLC color can also be printed at different brightness levels or, respectively, color saturation levels in highlight color printing. The standard color is normally black and is printed in different grey levels.

Highlight color printing is more cost-effective than a full color printing with four primary colors (what is known as four-color printing) in which the most varied colors can be achieved via the superimposed printing of the primary colors cyan, magenta, yellow and black. In four-color printing it is disadvantageous that the luminosity of the colors that can be printed is limited in spite of the diversity of color. Often a luminosity required by a customer (and therefore a customer-specific special color) can frequently not be achieved in four-color printing methods, primarily in the red, green and blue ranges.

Since often only one special color is desired, for such applications it is significantly more reasonable to use special print colors that have the desired color when they are printed over the entire area of the paper.

A method with which what are known as color management resources (CMR) are used to describe color properties of objects of a document is known from US 2005/0248787 A1, which color management resources are used in the processing of document data in order to match color-related specifications in the output.

Additional concepts for processing of resource-based print data streams are contained in the patent application filed on the same priority date by the applicant with the title "Verfahren, Computerprogrammprodukt und Vorrichtung zur Erzeugung und Verarbeitung von Dokumentendaten mit medienbezogenen Farbmanagementressourcen".

Printing processes are increasingly more comprehensive since ever more devices are integrated into a printing process, whereby the functional diversity increases. Printing processes are additionally increasingly executed distributed over a region via internet and intranet or are associated with a pool of printers that can be regionally distributed. Moreover, devices of different manufacturers must increasingly cooperate in a process. In order to be able to meet these rising demands, what are known as job ticket data are provided that are exchanged (in particular in a file separate from the rest of the document data stream) between two or more software and/or hardware systems as job chaperone data regarding a document data stream. A uniform specification for exchange of data formats in a printing process that is designated as a job definition format (JDF) was agreed upon in an industry consortium. There is a corresponding job messaging format (or, respectively, JMF) for this that is correspondingly specified. The specification of JDF can be downloaded from the Internet site www.cip4.org; at the point in time of the present patent application the current specification is JDF Specification Release 1.3 see there in particular the overview on pages I through xx as well as the introduction on pages 1 through 34.

The aforementioned publications or documents are herewith incorporated by reference into the present specification, and the methods, systems and measures described there can be applied in connection with the present preferred embodiment.

SUMMARY

It is an object to improve the processing of color information in a resource-based document data stream.

In a method, program, or device to generate or process a document data stream that comprises data relating to color management resources wherein processing of color-related data of the document data stream can be controlled, associating at least one indexed color management resource with the document data stream wherein with the management resource color-related data of the document data stream can be associated with multiple predetermined color palettes. Within a color palette, an index value is respectively associated with multiple color. Respective values regarding the index colors are stored in the color management resource. The values are associated with corresponding proportions of color tones to reproduce the respective indexed color. The color palettes are compared between the system that generates the document data and an output system that outputs the document data, the document data stream is structured.

BRIEF DESCRIPTION OF THE DRAWINGS

FIG. 4 shows example data to establish output device-specific par s in document data streams;

FIG. 5 shows example data to characterize available color tones in an output device;

FIG. 6 illustrates example data to specify the availability of corresponding color tones in duplex printing;

FIG. 7 shows examples to characterize color tones;

FIG. 8 illustrates examples of color palette entries;

FIG. 9 illustrates examples of color management index color lists;

FIG. 10 shows a data structure for a CMYK color space;

FIG. 11 shows a data structure to replace a color palette;

FIG. 12 shows an IPDS-typical triplet data structure;

FIG. 13 shows a data structure for images that consist of multiple image parts; and FIG. 14 illustrates a method to associate colors of a predefined color space.

DESCRIPTION OF THE PREFERRED EMBODIMENT

Figure 1:
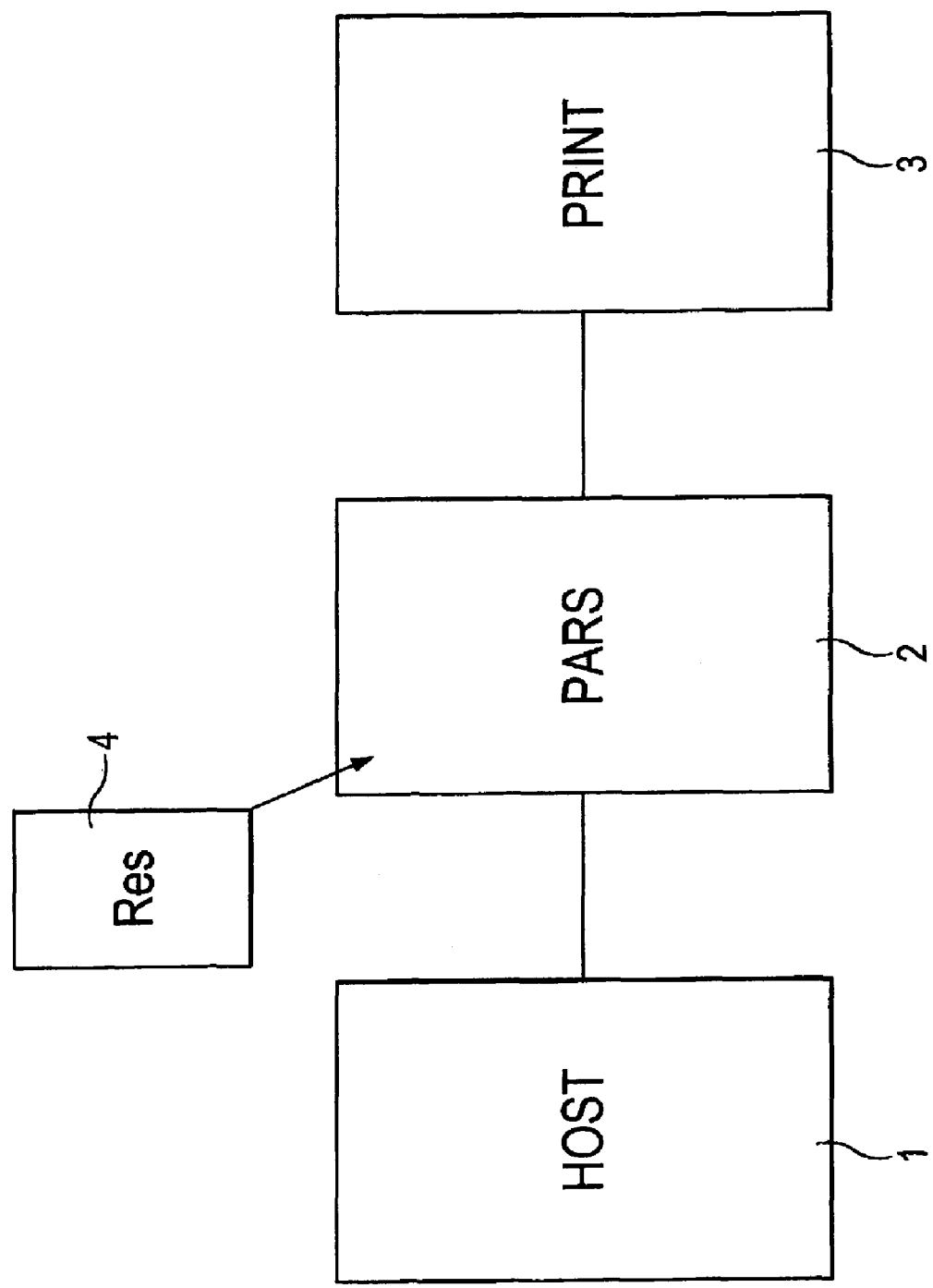
FIG. 1 shows a document production system.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

According to a first aspect of the preferred embodiment, to generate and/or process a document data stream that comprises data regarding color management resources (with which data the processing of color-related data of the document data stream can be controlled), at least one indexed color management resource is associated with the document data stream, with which indexed color management resource at least one predetermined color palette can be associated with color-related data of the document data stream.

The preferred embodiment is based on the realization that the handling of color-related data can be significantly simplified if the basis to which the color data refer or the available color space associated with this is limited.

The preferred embodiment is furthermore based on the realization that, in the generation and/or processing of document data, the graphical reproduction of the color objects contained in the documents is already limited by the output devices thereby used due to the device-specific color characteristics (such as, for example, the printing colorants available in a printing device).

Furthermore, it was realized that the cited limitations for the transfer of document data that define color information on the basis of color management resources, both a very precise, device-spanning color association and a high-performance processing of the color data are possible via reference to predetermined color palettes because the color coding is accomplished with only a few data sets and the color data processing is accomplished with little effort. In particular, with the preferred embodiment the advantage can be achieved that elaborate color data transformations are not required because the predetermined color palettes is known across systems, from the system that generates the document data up to the output system that outputs the document data (for example in a printing device), and in particular has already been calibrated in advance.

Via the referral of the document data to an indexed color management resource, it is thereby possible to address color information via a short index code comprising, for example, only a few bytes. A reduction of the data stream volume is in particular possible in the transfer of the document data stream based on the indexed color management resource that contains more precise specifications about the color data associated with this code because special color tones (such as, for example, highlight colors) can be directly addressed with an index value. The indexed color management resource can in particular contain data that contains information about a color space associated with the index code, such as red-green-blue (RGB), yellow-magenta-cyan-black (YMCK), grey tones or a mixture of individual color tones (what are known as colorants), for example. The indexed color management resource can index the individual color tones or colorants, in particular via a plain text name.

The colors defined or directly addressable with the index code can correspond to one or more color tones and/or colorants or even a combination of one or more of these color tones. For processing of document data it has in particular proven to be sufficient to define a limited number of colors (for example 64,000 colors) as a color palette. The specification of the colors in detail can thereby in particular occur individually according to application. However, it in particular applies across processes from the generation of a document up to its output at an output device. The specification for a color palette can, however, also apply across applications, wherein it is even conceivable that specific color palettes with their associated color tones are standardized or determined in a color definition system. In the output device, referenced, indexed colors in the data stream can then be directly mapped to the corresponding color tones or color tone combinations available in the output device and be used to control/output the corresponding colorants.

A color palette can in particular be encoded with relatively short codes, for example with two-byte codes for 64,000 colors. It is thereby possible to sub-divide the available colors into various palettes, wherein (for example) 264 palettes are coded with a first byte and 264 colors per palette are encoded with a second byte.

According to a second aspect of the preferred embodiment that can be viewed independently or in combination with the first aspect of the preferred embodiment, to transfer a color information of an object into a resource-structured document data stream the color information is transferred via an index value that corresponds to an entry in an indexed color management resource.

The index value is thereby a relatively simple, short numerical code that corresponds to a limited number of available colors and comprises only a few bytes (for example one to four). Within the color management resource, the numerical code is in particular associated with a color model and/or a color. The color management resource can in particular be generated independent of the document data stream and/or be exchanged between a system sending the document data and the system receiving the document data. Generation, exchange and storage of the color management resource can thereby in particular occur according to the methods typical for resources in the print data streams AFP and IPDS. The methods, measures and system structures specified in US 2005/0248787A1 in connection with color management resources can also be advantageously used in connection with the present preferred embodiment. For this, this document is again incorporated by reference into the present specification at this point.

According to the preferred embodiment, encoded reference information that specifies which primary color tones or primary color tone components should be used in the output of the data can thus already be generated across processes in the generation of documents. The primary color tones can already be selected or determined in advance corresponding to the primary colors available in an output device. They and/or the color system formed by them are moreover freely selectable, i.e. not unconditionally bound to existing color systems such as RGB or YMCK, for example. Various references can thereby occur per object within a data stream or even documents, for example a first object according to a first color system (for example RGB) and a second object according to a second color system that is independent of the first. It is thereby in particular enabled to reference an output device-specific color system in the document data stream via an index (i.e. directly with only a few items of control data). The color system is thereby in particular defined specific to the device via device-specific color tones such as, for example, highlight colors or Custom Tone® colors that are not primary colors of a conventional color system.

To generate an indexed color management resource, it is in particular advantageous to have available or to store in a table the color tones and/or printing materials available in an output device (such as, for example, a printer) as well as their properties (such as, for example, colorimetric color values). These can then be considered in the creation of the indexed color management resource and in particular also incorporated into the color management resource. For a largely automated creation of indexed color management resources it is advantageous when the output devices automatically reports these values to a control system that controls the generation of the color management resource. This can occur in a print production environment, for example via a data network as well as a print server.

According to an advantageous exemplary embodiment of the invention, the indexed color management resource contains coded information (for example in a header region (header section) that is associated with the number of the process color palettes available in the indexed color management resource.

In an additional advantageous exemplary embodiment of the invention, the indexed color management resource contains coded information per process color palette, which coded information indicates which color tones available in the output system and/or defined in a color system (such as RGB or YMCK, for example) are available to reproduce the process colors of the respective process color palettes.

According to a further preferred exemplary embodiment of the invention, the coded information of a color tone is associated with an (in particular freely selectable) plain text name and/or a color tone number of a predetermined color definition system such as, for example, the Pantone® system or the RAL® system.

Furthermore, it is advantageous when the indexed color management resource and/or data of the document data stream associated with it contains, per process color palette, one item of coded information about the process colors available in the document data generation process and/or processing process and/or in the output device.

Furthermore, the indexed color management resource in particular contains coded information that indicates with which second color palette data of the document data stream are re-associated when they cannot be reproduced at an output device with the original association with a first color palette.

The document data stream can in particular be structured according to the AFP, MO:DCA and/or IPDS specification, and can in particular comprise additional resources corresponding to the respective specification.

The preferred embodiment is in particular provided to transfer document data streams between a system generating the document data stream and a system processing the document data stream, wherein the generating system can in particular be a host computer or a print server. The processing system can in particular be a print server or a printing device. The processing steps of the color association can thereby be implemented at least in part in a host computer, in a print server and/or in a printing device. Upon output of the data from a host computer to a printing device or a print server, the print server can in particular convert the data, for example from MO:DCA format into the IPDS format.

According to a further advantageous exemplary embodiment of the invention, in the processing of the document data stream it is checked whether a color and/or color palette referenced in the data stream by means of an index code and defined in the color management resource is available at the output device before the output occurs. For this it can also be provided that a specification for a substitution color and/or a substitution color palette is contained in the color management resource that is used instead of the referenced color and/or color palette to output the document data stream when the referenced color and/or color palette is available in the output device.

The preferred embodiment can in particular be provided to process document data streams of the AFP, MO:DCA or IPDS formats. However, it is not limited to such data streams, but rather can also be used in connection with other data streams (such as, for example, Postscript, PCL or PDF) with which document data can be encoded, wherein for the last cited data streams it is in particular proposed to adopt a corresponding resource concept for these purposes, wherein color management resources are provided.

According to a further advantageous exemplary embodiment of the invention, the color management resource contains an identifier that is associated with a color palette, wherein the color palette is in particular associated with a color space (such as, for example, CMYK, CIELAB, RGB, grey tones) or an individual color tone space, what is known as a colorant color tone space. In an individual color tone space, colors can be defined on the basis of arbitrary primary color tones that can be defined in a color management resource and, for example, can be adapted corresponding to available colors in output devices. A color-consistent processing of objects is, therefore, in particular in document data streams and in particular with output devices that print with the aforementioned highlight color colors. The number of available individual colors can thereby be arbitrary in principle, for example two corresponding to a printing with black and one highlight color or (for example) even seven colors as they are contained in the Océ CPS 700" devices described under Océ Direct Imaging in Chapter 11 in the aforementioned Océ "Druckerbuch".

The color management resources in particular contain identifiers in table form with which index identifiers contained in the document data stream can be associated with a respective color space or a color palette. With regard to an "individual color tones" color space, encoded information that represents the color tones defined in the color space is in particular stored in the color management resource as color tone lists. The color tones in particular correspond to the primary color tones available in an output device, for example to the colors of the toner available in an electrographic printing device.

The encoded color tone information can thereby in particular contain text specifications with which a name for the color tones can respectively be stored as a text code.

To generate a color management resource, the primary color tones available in an output device can in particular be automatically transferred from the output device (and in particular via a print server) to a system provided to generate the color management resource.

In AFP/MO:DCA document data streams, according to the typical methods a color management resource can be associated with a document object via structured fields or triplets, for example with a Medium Modification Control (MMC) field, an Object Identification (OID), the triplet X '92', a resource access table (RAT) etc. The hierarchical structures that are thereby typical can be adopted. The triplet X '4E' can be correspondingly extended to support the indexed color management resources.

The resource association via the cited methods is in particular described in detail in US 2005/0248787 A1 in connection with FIGS. 1 through 6 there and are incorporated by reference at this point of the specification for this purpose.

The introduction of color management resources in which individual color tones are provided (in particular in the form of freely selectable texts) allows a simplified communication between various systems that are participating in the creation or processing of the corresponding document data streams, for example between AFP applications and IPDS printing devices. The color accuracy in the output of documents can thereby be ensured with relatively slight effort, in particular when individual color tones or the colorants associated with them that are specifically available in the output devices can be directly controlled via a simple index value. In the processing of the corresponding document data it can therefore be checked (for example already checked in a print server or in a printing device) whether the required color tone or the corresponding colorant is available in the respective printing device. Within a print center, a print job can then be relayed in a targeted manner to a connected printer that contains this print colorant.

Furthermore, it is thereby enabled that color tones in extraordinary color tone ranges are generated in the generation of documents in that, for example, multiple individual color tones or, respectively, colorants associated with them are combined into new color tones. If the individual color tones or the color palettes connected with these are individually and freely configurable and the respective colors can be directly controlled in the processing of the document data with index values of small data volume, the processing process (in particular the data transfer and the processing of color data in the output) is simplified. In the event that the color tones are not available in an output device, which substitution colors are used can already be established in advance, whereby incalculable color associations in color transformation systems that are not yet known upon the creation of the documents can be avoided.

The described concept for color management resources achieves for creators of documents a flexible, device-independent system because it opens up possibilities of document design from printing in greyscale to full-color applications with a plurality of different primary colors. Additional functionalities of highlight color or "spot color" in Postscript/PDF containers can be integrated into the proposed environment.

According to a third aspect of the preferred embodiment that can be executed together with or independent of both aforementioned aspects of the preferred embodiment, the resource reference data and the medium reference data are logically linked with one another upon generation of a resource-based document data stream with which the output of at least one document on an output medium (in particular on a recording medium) can be controlled, wherein the document data stream contains resource reference data referring to at least one color management resource and medium reference data referring to the output medium. Via this connection or association, given a change of a reference to an output medium within the document data stream a change of the reference to a color management resource can occur automatically, in particular in a later, automated processing of the document data stream.

This third aspect of the preferred embodiment is based on the realization that the color effect of color components is different depending on the recording medium given the reproduction of a document on different recording mediums. Furthermore, it is based on the realization that in the reproduction of the color components on an output medium that is a recording medium whose properties with regard to color, brightness, weight and/or surface influence the effect or the values of the ultimately reproduced colors. Accordingly, in a preferred exemplary embodiment of the invention for processing of color-related data of document data streams that are provided on a specific output medium, a color management resource individually associated with the output medium is in particular provided that contains data adapted to the corresponding properties of the output medium. A logical connection or referencing already present in the data stream can accordingly be used to control color output elements in the processing and in particular output of the document data stream in an output device.

Furthermore, it was recognized that—on the basis of the resource model for document data streams—the association of an output medium with document regions (in particular one or more document pages that should be output on the same output medium), the scope of the document data stream can be minimized in that the corresponding medium is selected only with reference data at corresponding, document-related points, and the corresponding detailed control data with regard to the medium (here in particular color management resources) can be linked with the medium via index-like resource reference data or can be used to control the output in the later processing or reproduction of the data. This is in particular achieved in that resource reference data referring to a color management resource and the medium reference data within the document data stream are logically linked with one another.

The association of resource reference data and acquisition medium reference data can be retained or also altered within the document data stream that comprises data regarding multiple documents, within document pages and/or within document page ranges that can comprise successive pages.

The association of a color management resource regarding a recording medium can in particular occur by referencing the color management resource within a data element associated with the recording medium.

The association of attributes related to color management resources, page-related and/or media-related attributes within the document data stream can in particular occur hierarchically according to document regions. An adjustment related to a color management resource can thereby in particular occur relative to the value of a superordinate hierarchy level if a hierarchy level is ended.

Further details of the third aspect of the preferred embodiment are contained in the aforementioned patent application filed on the same day by the applicant with the title "Verfahren, Computerprogrammprodukt und Vorrichtung zur Erzeugung und Verarbeitung von Dokumentendaten mit medienbezogenen Farbmanagementressourcen", which is again incorporated by reference into the present specification at this point for this purpose.

According to a further advantageous exemplary embodiment, data about the color management resources are integrated into a print job chaperone file (that is in particular formed according to the JDF standard), and the print job chaperone file is exchanged between two data processing systems participating in the processing of the print data. The data about the color management resources can thereby be very different with regard to their scope, depending on the requirements that are posed for processing of the print data and the conditions such as, for example, the availability of the color management resources in a downstream data processing system. For example, they can range from simple information comprising 1 bit that indicates whether the print job should be processed with color management resources to the referencing of color management resources or types of color management resources to the concrete data of the color management resource as such.

A document generation and printing system that comprises a host computer 1, a print server 2 and a high-capacity printer 3 is shown in FIG. 1. Generated in the host computer 1 are, on the one hand, variable print data (for example from a database) and, on the other hand, a pagedef file and a formdef file comprising resources, from which an Advanced Function Presentation data stream is formed. The document data stream so generated is supplied to the print server 2 in which the document data stream is prepared and converted into an Intelligent Printer Data Stream (IPDS) for output to the printing device 3. For this, multiple processes that are controlled by software modules run on the print server 2. A first software module incorporates into these processes additional resource data 4 (such as fonts or overlays, for example) that are called in the original document data stream. A second software module, the parsing module, checks the document data stream for consistency with predetermined rules. Upstream of the parsing process is a pre-parsing process that is implemented by a corresponding software module in which an identification datum is associated with each resource call and the associated resource file in addition to the resource name, via which identification file the resource is uniquely identified relative to all other resources of the document data stream. Within the document data stream, the resource can then be called once or multiple times by means of the resource name and/or the identification datum to show the document data and the resource data on the printing device 3. The processes shown here in the print server can also be implemented partially or wholly in a controller of the printing device. The IPDS data stream is rastered and the documents are printed out in the printing device.

In the shown exemplary embodiment, the AFP document data stream contains documents that correspond to the MO:DCA standard and respectively contain reference data for data objects that are available through the print server 2. The resource data 4 can thereby be transferred from the host computer 1 to the print server 2 separately from the MO:DCA document data stream or already be stored in the print server 2 as external resources. The resource data can, however, also be transferred together with the document data stream from the host computer 1 to the print server 2 as embedded resource data (what are known as inline resources). Further details of a corresponding data processing are described in WO-A1-2004/0008379, which for this is incorporated by reference at this point of the specification. The resource data can contain what are known as data object resources that contain object data which are in particular repeatedly referenced in an identical manner in a document data stream. Such data objects can contain image data, text data and/or graphic data, for example. The reference to the object resources can occur via an object resource library that contains characterizing data regarding the object as well as data about the storage location of the corresponding object data. The library comprises a data object resource access table (RAT) that, for the print server 2, acts as an index table for the access by the print server to the resource data.

The print server 2 receives the MO:DCA document data stream from the host computer 1, converts it into an IPDS document data stream and sends this to the printing device 3. In the course of the data conversion, the print server 2 reads the reference information (name) of a data object from the MO:DCA document data stream and accesses the stored data resource with the aid of the data object resource access table (RAT). The complete data of the object are then integrated into an IPDS data stream and send to the printing device 3. This method can be applied just as well when the data are sent to a different output device (for example to a color monitor) instead of to a printing device.

An MO:DCA document data stream is structured in data elements that are largely self-explanatory. Structured fields are important components of the MO:DCA structure. A structured field is sub-divided into multiple parts. A first part (introducer) identifies the desired command, indicates the total length of the command and specifies additional control information (for example whether additional filler bytes (what are known as padding bytes) are present. The data contained in a structured field can be coded as fixed parameters, contain repetition information (repeating groups), keywords and what are known as triplets. The fixed parameters deploy their effect only for the structure in which they are contained. Repeating groups specify a grouping of parameters that can occur multiple times. Keywords are self-explanatory parameters that typically comprise two bytes, wherein the first byte is an identification byte for the keyword and the second byte is a characteristic data value for the keyword. Triplets are self-explanatory parameters that contain a length specification in a first byte, a characteristic identification information for the triplet in a second byte and up to 252 data bytes. The cited data streams of a MO:DCA document data stream define a syntax that can be evaluated in the course of a parsing process and can be flexibly expanded.

MO:DCA data streams are furthermore hierarchically subdivided, wherein information that concerns the entire data stream (print file component) are contained in the topmost hierarchy level. Defined in the next hierarchy level are documents which are broken down per hierarchy level into page ranges (Engl. page groups) comprising multiple pages; pages; and page elements which can in turn break down into sub-hierarchies. The page elements are thereby in particular objects which represent the lowest hierarchy level. Object components can be graphics, images, presentation text or barcodes, for example.

Each hierarchy level of the MO:DCA document data stream can be defined by a pair of structured fields of a start-structured field and an end-structured field. It is thereby in particular possible that a processor that processes the data can ignore an element that it cannot process. Examples of such beginning-end pairs are the pairs "Begin Document" (BDT) and "End Document" (EDT) or "Begin Page" (BPG) and "End Page" (EPG).

Corresponding pairs of structured fields—namely the structured field "Begin Resource" (BRS) and "End Resource" (ERS)—are also provided for document objects that are referenced via a resource. Additional resource objects can be referenced within a resource object.

Color management resources (CMR) for processing of color-related information regarding document objects have been proposed in US 2005/0248787 A1. Various types of color management resources are reasonably provided:

A color conversion color management resource (Color Conversion CMR) that defines a device-dependent color, for example a color that is defined by an input device such as, for example, a scanner or by a reproduced color of an output device such as, for example, a printing device. The color is thereby presented on the basis of a device-independent color space such as, for example, the CIELAB color space. A color management resource can thereby contain data of an ICC color profile, for example.

An additional color management resource is the linked color conversion color management resource (Link Color Conversion CMR). With it a color transformation for a color object can be defined that: was generated or, respectively, acquired with a first device; has a device-specific color characteristic; and is output with a second device that has a different device-dependent color characteristic relative to the first device. With a link color conversion CMR, the conversion of the data of an object that is defined in the RGB color space can then occur directly into data (for example) that are output at a printing device that operates on the basis of the CMYK color space. The RGB document data can thereby be converted directly into the CMYK space with a corresponding conversion table (look-up table). The look-up table thereby furthermore enables color characteristics—in particular the ICC profiles of both devices for generation of the RGB image data (for example a camera) and of the output device (for example printing device) to be directly incorporated, such that the color transformation both between the two color spaces and under consideration of the two device-specific color profiles in a processing step can occur in one processing step using the look-up table. In connection with the present invention, a Link Color Conversion CMR can advantageously be generated and used, for example in that it contains transformation values with input values of the indexed colors or color palettes directly into control values for a process color printer. In particular this is advantageous when the process color printer does in fact contain the four primary colors CMYK but not one or more referenced HLC colors.

An additional CMR type is a half tone image color management resource (Half Tone Screen CMR). How digitized color tone values of a color are transformed into the digitized values of a color that comprises fewer bits is defined with such a CMR; for example, a conversion from one color that is described in eight bits into a color that is described with less than bits can occur with this. The appearance of a color document in the output can therefore be modified or, respectively, adapted.

What are known as calibration curve color management resources (calibration curve CMR) define information with which control parameters for an output color can be modified; for example, the brightness and/or the saturation of the output components can therefore be altered.

Multiple color management resources can be associated with a document object or, respectively, multiple references to this document object can occur in color management resources; for example, an operation with a calibration curve color management resource can initially be applied for a document object, and after this a measure according to a half tone screen color management resource.

Color management resources can be handled as object container resources, in particular in IPDS document data streams.

Figure 2:
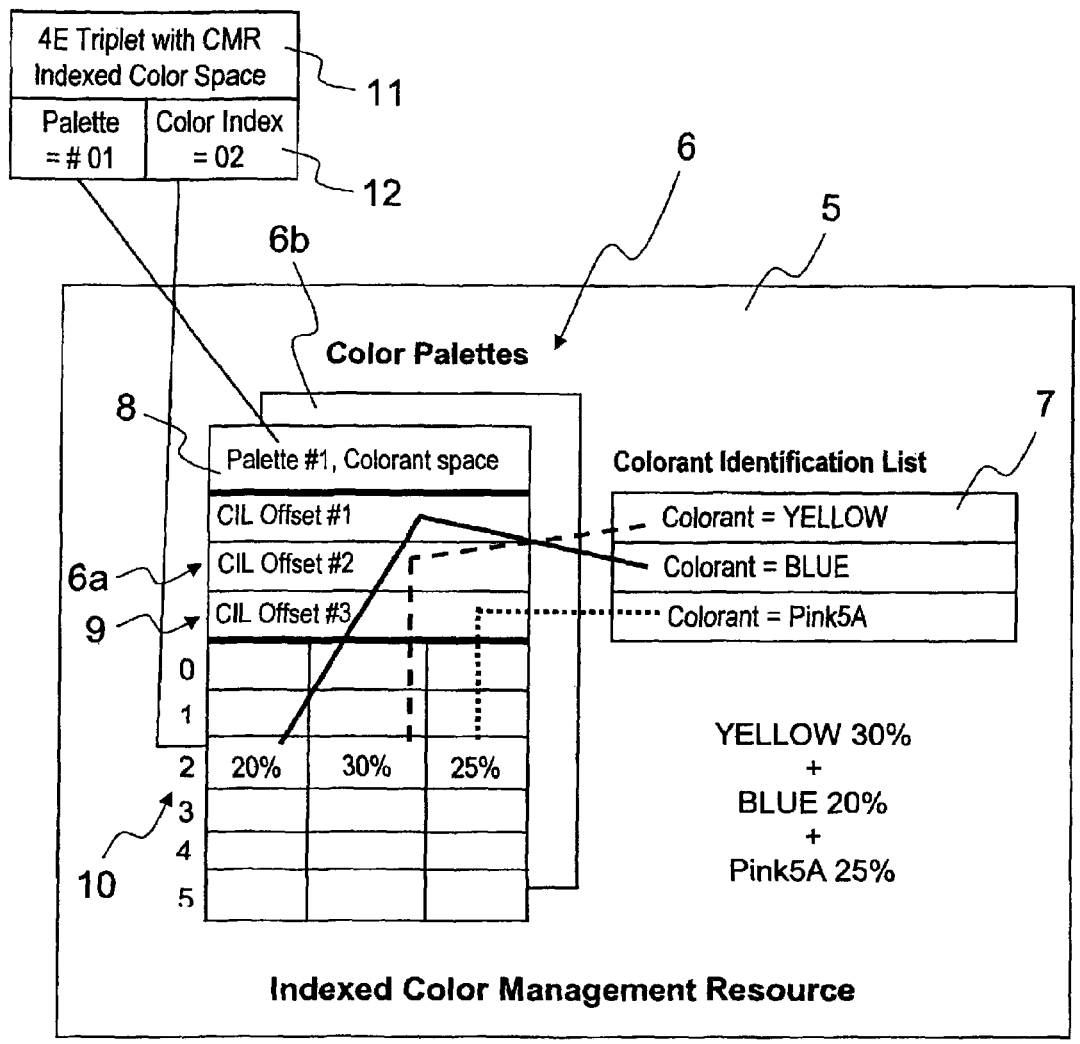
FIG. 2 illustrates an example for an indexed color management resource.

An example of how an indexed color or color management resource can be controlled or, respectively, the color control data stored there can be retrieved with a "4E" triplet of an MO:DCA data stream is shown in FIG. 2.

For this an indexed color management resource 5 contains color palette data 6 and data regarding individual color tones or, respectively, printing colorants (which can consist of toner or ink, for example, which data are stored in a color tone identification list 7.

In this example the color palette data are divided up into a first color palette 6a and a second color palette 6b; however, instead of this they can also be integrated into a corresponding larger single color palette. The color tone identification list 7 is associated with the color palettes 6a or 6b. For this the data of the identification list contain characteristics of the individual color tones that are associated with corresponding association data in a color tone information region 9 of the color palette 6a. Header information 8 is provided to identify the color palette 6a. For the indexed color values with regard to the three color tones or their associated color printing materials yellow, blue and pink 5a that are listed in the color tone identification list 7, respective values that correspond to corresponding proportions of these three color tones for reproduction of the indexed color value are stored in a data region 10 of the color palette 6a. A "4E" triplet stored in the MO:DCA data stream, which "4E" triplet references the index color management resource 5, contains referencing data 12 with which the color values stored in the color management resource 5 can be retrieved. In the shown example, the referencing datum comprises a first byte that corresponds to the palette number #01 and a second byte #02 that references the color indexed in the palette. The index color number 2 referenced in the shown example consists of a mixture of the individual color tones (or, respectively, color printing materials) yellow at 20%, blue at 20% and pink 5a at 25%.

Figure 3:
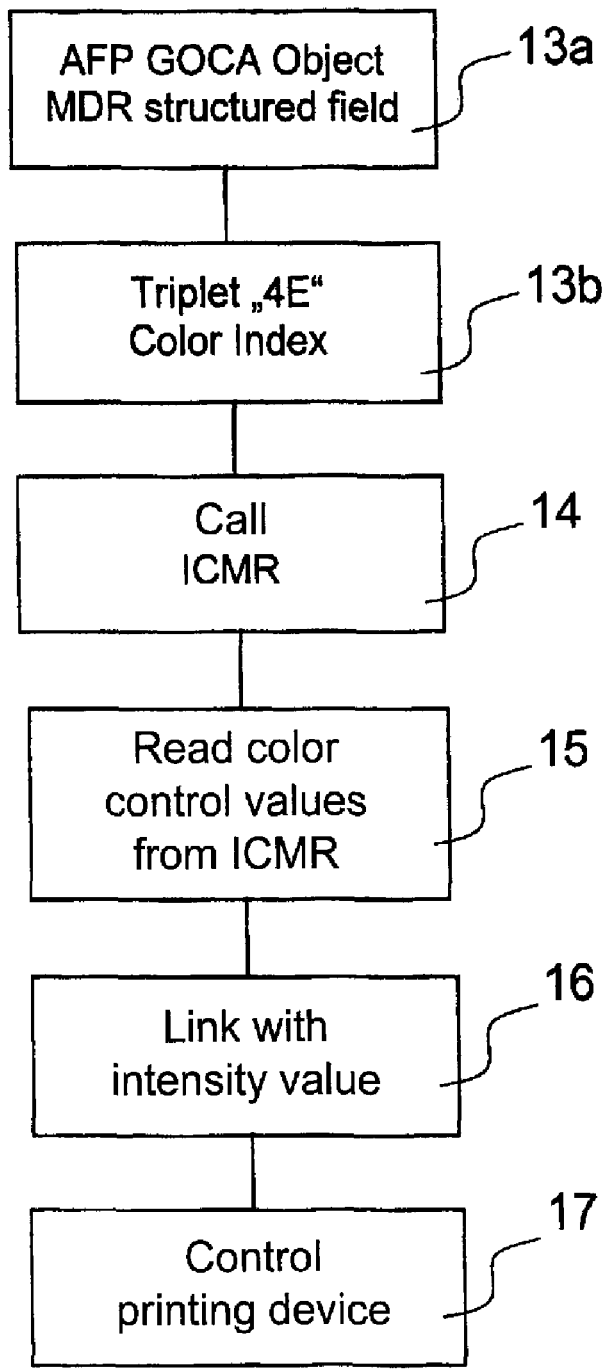
FIG. 3 shows a method workflow for association of colors in a print job.

Illustrated in FIG. 3 is a method with which a color association can occur on the basis of indexed color management resources in a GOCA object 13a of a MO:DCA application. The structured field MDR thereby contains in the OEG of this object container a reference information regarding the indexed color management resource 14. Furthermore, a color index is referenced in the "4E" triplet 13b. Upon interpretation (parsing) of the data stream in the print server 2, based on this reference value the corresponding indexed color management resource is called in Step 14 and the corresponding color control values for the corresponding color tones are read out from the index color management resource in Step 15. The cited step can also occur at the printing device as an alternative to the print server. The values read from the indexed color management resource are additionally overlaid with intensity values before the output of the data stream at the printing device, which intensity values are assigned (Step 16) to the corresponding pixels color printing stations of the printing device are and correspondingly controlled in Step 17 corresponding to the color tone identification list 7.

Structure elements—what are known as output device facilities (Screen Device Facilities, SDF)—are provided in AFP, MO:DCA and IPDS data streams, with which structure elements output device-specific settings or specifications can be transferred or effected. An example is shown in FIG. 4 of how corresponding transfer fields for these data streams can be provided with which properties of output devices (in particular their ability to output color information) can be presented. The corresponding data structure field for such an SDF and its properties (number of bytes, name, scope of validity of the values (range) and data meaning (meaning)) are shown in Table 17a. Examples for corresponding additional data values of the SDF field are specified in Tables 18, 19, 20 and 21, namely data regarding general properties of the output device (in particular printing devices) in Table 18, data for a device that can only reproduced in black-and-white in Table 19, data for a device that can reproduce at least one highlight color in Table 20, and in Table 21 contains information that characterize an output device that can reproduce the full color data.

For an output device (for example printing device), the data corresponding to FIG. 4 can be recorded once for the device and be used as long as the corresponding characteristics of the output device do not change. The storage can be stored [sic] in the printing device itself, in a mobile data medium (such as, for example, a CD-ROM), in a print server or in a user computer, including a host computer that generates document data. The corresponding data can naturally also be transferred via data networks such as intranets or internet. These data can be used just as well as the subsequently cited data characterizing color properties of a printing device in detail in order to generate color management resources (in particular indexed color management resources). The color management resources can thereby in particular be stored in resource libraries. This can occur according to the method cited in US 2005/0248787 A1, for example, and with the components of a color management resource installation system (CMR Installer, reference number 301), a Color Engine (CEE, reference number 303) using a resource access table (Resource Access Table RAT, reference number 304) shown therein in FIG. 3, for example.

An example of an ADF structure is shown in FIG. 5, with which color tones that are present as primary colors in an output device can be characterized. For example, these can be the colors of various toners in an electrographic printing device or the Colors of various inks in an inkjet printer, or even the colors of various phosphors in a monitor. The colors can thereby exhibit individual color tones (in particular highlight color tones. The color tone identification table 18 proposed in FIG. 5 extends beyond the sub-FIGS. 5a and 5b. The identifier of the color tone is stored in bytes 2 through 3. A specific number for an HLC color space that identifies this color in a highlight color space can be stored in bytes 4 through 5. Additional properties of the color tone (or possibly of the appertaining printing colorant toner or ink) can additionally be stored in bytes 6 through 7, for example its coating properties (Coding Colorant), its visibility (Invisible Colorant), its magnetic properties (Magnetic Colorant), its fluorescing properties (Fluorescent Colorant) and its transparency property (Transparency Colorant). A characteristic value that describes whether the color is available over the entire printing width or only a portion of the printing width can be stored in bytes 8 through 9.

An SDF entry with which it can be specified whether the corresponding color tone is available on the front side and/or the back side in the printing of a recording medium is specially provided for printing applications in FIG. 6.

Which information can be provided in an indexed color management resource to characterize individual color tones is presented in FIG. 7, which extends beyond the sub-FIGS. 7a and 7b, said information further developing the information already presented in FIGS. 5 and 6. To identify the color tone, on the one hand a color tone number (bytes 4 through 5) is provided, on the other hand freely selectable names encoded as an 8-bit or 16-bit Unicode string. It thereby also be provided to separately designate or encode (and therefore immediately recognize) color tones that are already defined in a standardized color catalog such as Pantone® or RAL®, for example.

FIG. 8a shows a table 21 that corresponds byte-for-byte with a color palette entry or a color palette field in an indexed color management resource that contains only one color palette. The length bytes shown under the heading row in the first table row designate the length of the entire entry. The bytes with the name "Type" indicate for which color space the palette is provided, namely for the Color Conversion, Link Color Conversion, Half Tone Screen, Calibration Curve or Indexed CMR color space. The number of the available color tone components is indicated in the row with the name "CNO", and the color tones are individually referenced in the rows as of the offset value+16. Details regarding the color palette field table 21 or the bytes listed in them (arranged according to offset numbers) are presented in FIG. 8b.

FIG. 9 shows an example of information that is contained as a data structure in an indexed color management resource in which an individual color space is formed from three individual color tones and a transparency value. A corresponding data structure for a CMYK color space without a transparency value is shown in FIG. 10.

A data structure for a color palette field that contains entries to replace a first color with a second color is shown in FIG. 11. One or more such color replacement palettes can be contained in a color management resource. The color replacement palette is used when an originally referenced color palette is not suitable for the output device, for example when the referenced color palette defines a color tone that cannot be reproduced by a printing device (which can even be a full color printing device), or when a color palette with different colors is referenced but the printing device is a black-and-white printing device. The use of such substitution palettes can be prevented by a system controller, in particular if the system controller possesses what is known as a color fidelity function that (for example in the processing of print jobs) ensures that print jobs are only output to the printing devices if the printing devices are in the position to exactly reproduce the colors referenced in the print job. In the event that the color fidelity function is activated and the referenced colorants cannot be provided in the printing device, an error message and/or a printing stop are triggered.

In a color management resource it is advantageous when the substitution palette is stored or referenced with the same palette number immediately after the corresponding color palette. If multiple substitution palettes are loaded, their use can be hierarchically controlled, for example in that the color substitution palettes are processed in order and the first color palette that is suitable for the output device is used. If none of the color palettes is suitable, the printing device can execute the color association according to its default, or an error message up to a printing stop can be generated.

The data structure of an X'4E' triplet is shown in FIG. 12, which X'4E' triplet can be used with various IPDS commands such as, for example, "Load Page Descriptor", "Right Image Control 2", "Right Graphics Control", "Object Container Control", "Include Data Object" or "Presentation Space (Page, Overlay, OC, IOCA, GOCA, BCOCA)".

The existing X'4E' triplet according to the previously applied IPDS specification can thereby be expanded by the value 30 (hex) (for example in byte number 3 (Color Space)), which specifies that an indexed color management resource is referenced. An expanded color space (what is known as the indexed color space) is thereby addressable in which in particular highlight colors, spot colors and individual special color tones (Named Colors) can be addressed. Additional explanations regarding bytes 3 and 12 through 13 are specified in FIG. 12.

Presented in FIG. 13 is a data structure with which document objects (in particular images) can be individually processed with indexed color management resources even when the images consist of multiple image parts (tiles). Each image part can then carry its own tile set colors (SDF), and various tiles are inked with various color components (in particular highlight colors).

FIG. 14 shows a mode of operation in which the color association can be made by means of an X'4E' triplet when colors from a predefined color system (Engl. Color Definition System) such as, for example, the Pantone® color definition system or the RAL® color definition system are referenced. The special color name is addressed in text or as a number via the reference 24 and is recognized in the application in Step 25. In Step 26 it is then checked whether a color transformation table (LUT) is available for this and, if possible, the color transformation is conducted in Step 27 and the printing process is conducted in full color in Step 28. In the event that it is established in Step 26 that the conversion table is not available, in Step 29 it is checked whether the "Color Fidelity" setting was made in the system. If applicable a notification is output that this setting is set, and the output can be blocked until further notice (Step 30). In the event that the option "Color Fidelity" is not set, in Step 31 it can be checked whether a substitution palette (see FIG. 11) is defined with regard to the referenced color, and if applicable in Step 32 the object or document is printed with this color palette in Step 32. In the event that no replacement color palette can also be used, the object or, respectively, document is output with the default settings of the output device (printer) in Step 33.

Although the invention was primarily described in the preceding using the AFP, MO:DCA and IPDS data streams, it is clear that the concepts corresponding to it are also applicable to other document data streams such as, for example, PCL, Postscript, PDF, LCDS and PPML (Personalized Printer Markup Language), in particular when these already provide resource data and corresponding calls. However, data streams that have previously provided no resource data can also be expanded with suitable resource structures and calls.

The concrete extension proposals specified for the existing data stream specifications regarding AFP, MO:DCA and IPDS (in particular in the exemplary embodiments), such as, for example, the extension of the X'4E' triplet with the value 30 (hex) indicated in FIG. 12, are to be understood only as non-binding examples, and the basic concepts of the preferred embodiment can naturally also be achieved in these data streams via other concrete extension specifications.

The preferred embodiment is in particular suited to be realized as a computer program (software). It can therefore be distributed as a computer program module as a file on a data medium such as a diskette, DVD or CD-ROM, or as a file via a data or communication network. Such and comparable computer program products or computer program elements are embodiments of the invention. The workflow according to the preferred embodiment can be applied in a computer, in a printing device or in a printing system with upstream or downstream data processing devices. It is thereby clear that corresponding computers at which the invention is applied can contain additional, known technical devices such as input means (keyboard, mouse, touchscreen), a microprocessor, a data or control bus, a display device (monitor, display) as well as a working memory, a hard drive storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

The invention claimed is:

1. A method to generate or process a document data stream that comprises data relating to color management resources wherein processing of color-related data of the document data stream can be controlled, comprising the steps of:
   associating at least one indexed color management resource with the document data stream wherein with the indexed color management resource color-related data of the document data stream can be associated with multiple predetermined color pallets;
   within a color palette respectively associating an index value with multiple colors to index the colors;
   storing respective values regarding the indexed colors in the color management resource, the values being associated with corresponding proportions of color tones to reproduce the respective indexed color;
   comparing the color palettes across systems between a system that generates the document data and an output system that outputs the document data; and
   structuring the document data stream according to at least one of an AFP, MO:DCA, or IPDS specification.

2. A method according to claim 1 wherein the indexed color management resource contains encoded information that is associated with a number of process color palettes available in the indexed color management resource.

3. A method according to claim 1 wherein the indexed color management resource contains one item of encoded information per process color palette that specifies which color tones available in an output system or defined in a color system are required to reproduce the process colors of the respective process color palette.

4. A method according to claim 3 wherein the encoded information is associated with a plain text name of a color tone or a color tone number of a predetermined color definition system.

5. A method according to claim 1 wherein the indexed color management resource or its associated data of the document data stream contains, per process color palette, one item of encoded information about the process colors contained in the document data generation process in the document data processing process in the output device.

6. A method according to claim 1 wherein the indexed color management resource contains encoded information that indicates which color palette data of the document data stream are re-associated when they cannot be reproduced on an output device with the original association with a first color palette.

7. A method according to claim 1 wherein the document data stream is output from a print server to a printing device.

8. A method according to claim 7 wherein processing steps of the color association are implemented at least in part in a print server or in a printing device.

9. A method according to claim 1 wherein in the processing of the document data stream checking whether a color palette referenced in the data stream by means of an index code and defined in the color management resource are available in the output device, said checking occurring before the output.

10. A method according to claim 1 wherein the color management resource contains an identifier that is associated with a color palette, wherein the color palette is associated with a color space.

11. A method according to claim 10 wherein the identifier is associated with one of the color spaces "Individual color tones", CMYK, CIELAB, RGB, or grey tones.

12. A method according to claim 11 wherein information with regard to the color space "Individual color tones" is encoded in the color management resource, said information representing the color tones defined in said color space.

13. A method according to claim 11 wherein the primary color tones available in an output device are transferred from the output device to a system provided to generate the color management resource for generation of the color management resource to generate the data regarding the individual color tone color space in the color management resource.

14. A method according to claim 1 wherein the document data stream contains resource reference data concerning at least one color management resource, and medium reference data concerning the output medium; and wherein the resource reference data and the medium reference data are logically linked with one another such that with change of the output medium a change to another color management resource automatically occurs.

15. A method according to claim 14 wherein the color management resource contains data adapted to properties of the output medium for processing of color-related document data streams and for output of the document data on the output medium.

16. A method according to claim 15 wherein the output medium is a recording medium and recording medium data regarding at least one of its color, brightness, weight or surface property are provided in the color management resource.

17. A method according to claim 1 wherein data that are related to color management resources are provided as job chaperone data in a file that is separate from a rest of the document data stream.

18. A method according to claim 17 wherein the job chaperone data are structured according to a specification of the Job Definition Format.

19. A computer-readable medium comprising a computer program to generate or process a document data stream that comprises data relating to color management resources wherein processing of color-related data of the document data stream can be controlled, the program performing the steps of:

associating at least one indexed color management resource with the document data stream wherein with the indexed color management resource color-related data of the document data stream can be associated with multiple predetermined color pallets;

within a color palette respectively associating an index value with multiple colors to index the colors;

storing respective values regarding the indexed colors in the color management resource, the values being associated with corresponding proportions of color tones to reproduce the respective indexed color;

comparing the color palettes across systems between a system that generates the document data and an output system that outputs the document data; and structuring the document data stream according to at least one of an AFP, MO:DCA or IPDS specification.

20. A device to generate or process a document data stream that comprises data relating to color management resources wherein processing of color-related data of the document data stream can be controlled, comprising:

a controller using data relating to an index color management resource to form control signals that are suitable to control an output unit, said controller having a program for controlling processing of color-related data of the document data stream, said program performing the steps of associating at least one indexed color management resource with the document data stream wherein with the indexed color management resource color-related data of the document data stream can be associated with multiple predetermined color pallets;

within a color palette respectively associating an index value with multiple colors to index the colors;

storing respective values regarding the indexed colors in the color management resource, the values being associated with corresponding proportions of color tones to reproduce the respective indexed color;

comparing the color palettes across systems between a system that generates the document data and an output system that outputs the document data; and structuring the document data stream according to at least one of an AFP, MO:DCA, or IPDS specification.

21. A method to generate or process a document data stream that comprises data relating to color management resources wherein processing of color-related data of the document data stream can be controlled, comprising the steps of:

associating at least one indexed color management resource with the document data stream wherein with the indexed color management resource color-related data of the document data stream can be associated with multiple color pallets;

within a color palette respectively associating an index value with multiple colors to index the colors;

storing respective values regarding the indexed colors in the color management resource, the values being associated with corresponding proportions of color tones to reproduce the respective indexed color;

comparing the color palettes between a system that generates the document data and an output system that outputs the document data; and structuring the document data stream.

* * * * *